United States Patent Office 3,536,669
Patented Oct. 27, 1970

3,536,669
PROCESS FOR THE PREPARATION OF MODIFIED GLYCIDYL ISOCYANURATE RESIN
Peter Kleinschmidt, Dusseldorf-Wersten, and Manfred Budnowski, Dusseldorf-Holthausen, Germany, assignors to Henkel & Cie G.m.b.H., Dusseldorf-Holthausen, Germany, a corporation of Germany
No Drawing. Filed Nov. 16, 1967, Ser. No. 683,477
Claims priority, application Germany, Nov. 30, 1966, H 61,144
Int. Cl. C08g 22/00
U.S. Cl. 260—77.5                    7 Claims

ABSTRACT OF THE DISCLOSURE

This invention relates to a process of preparation or soft, hardenable epoxide resins based on triglycidyl isocyanurate which, when hardened, retain the desired high temperature stability with a greater flexibility than the corresponding hardened triglycidyl isocyanurate resins, as well as the soft, hardenable epoxide resins produced. This process is characterized by reacting a crystalline triglycidyl isocyanurate having an epoxide oxygen content of at least 14% with an organic isocyanate having a molecular weight of about 99 to 700, said organic isocyanate being present in a ratio of from 0.1 to 3.0 mols for each 10 mols of triglycidyl isocyanurate, and recoving a soft, hardenable epoxide resin.

THE PRIOR ART

It is well known to process crystalline triglycidyl isocyanurate by reaction with known epoxide resin hardeners, for example, with organic polycarboxylic acid anhydrides or with aromatic amines, to molded bodies, which are distinguished by outstanding electrical, mechanical and thermal properties. However, due to the relatively high melting point and the consequent high process temperatures, processing pure crystalline triglycidyl isocyanurate involves various difficulties. Moreover, pure crystalline triglycidyl isocyanurate is only very difficultly soluble in most of the usual solvents, so that its process from solutions, for example, for impregnation, becomes technically very expensive.

OBJECTS OF THE INVENTION

An object of the invention is to modify crystalline triglycidyl isocyanurate in such a manner that the resultant modified compound will melt at low temperatures and be easily soluble in solvents, while retaining, in hardened form, all other good properties.

Another object of this invention is the development of a process for the preparation of a soft, hardenable epoxide resin based on triglycidyl isocyanurate which comprises the steps of reacting about 10 mols of a crystalline triglycidyl isocyanurate having an epoxide oxygen content of at least 14% with from 0.1 to 3.0 mols of an organic compound having a molecular weight of about 99 to 700, said organic compound containing at least one isocyanate group in the molecule and free of other epoxide reacting substituents, at a temperature above the melting point of the ingredients for a time sufficient for the reaction product to attain a constant epoxide oxygen content, and recovering said soft, hardenable epoxide resin.

A further object of the invention is the obtention of a soft, hardenable modified glycidyl isocyanurate based on triglycidyl isocyanurate.

A yet further object of the present invention is the obtention of a hardened epoxide resin having improved physical properties without a substantial reduction of thermal properties by the reaction of the above soft, hardenable modified glycidyl isocyanurate, with an epoxide resin hardener.

These and other objects of the invention will become more apparent as the description thereof proceeds.

DESCRIPTION OF THE INVENTION

These objects have been achieved, according to the invention, in that crystalline triglycidyl isocyanurate having an epoxide oxygen content of at least 14% is reacted with organic isocyanates having a molecular weight of about 99 to 700, allotting about 0.1 to 3.0 mols, preferably 0.2 to 2.0 mols of isocyanate to each 10 mols of triglycidyl isocyanurate.

The crystalline triglycidyl isocyanurate, to be used according to the process of the invention, should have an epoxide oxygen content of at least 14%. The preparation of crystalline triglycidyl isocyanurate is known as such and described in U.S. Pat. No. 3,337,509, dated Aug. 22, 1967. This preparation can be accomplished by purifying crude reaction products, which are obtained, for example, by reacting cyanuric acid with an excess of epichlorohydrin. Crystalline triglycidyl isocyanurate with the required epoxide content can be obtained by a single or by repeated recrystallizations from suitable solvents, such as methanol.

In general, organic compounds containing one or several isocyanate groups in the molecule, having a molecular weight of between about 99 and 700 and being free of other epoxide reacting substituents, may be employed for the process of the invention. These organic isocyanates are described, for example, by W. Siefken in Liebig's "Annalen der Chemie" (562) 1949, pp. 75–136. Suitable are, for example, alkyl isocyanates such as n-butyl-isocyanate, dodecylisocyanate, octadecylisocyanate; alkenyl isocyanates such as oleylisocyanate; disycloalkylalkyl isocyanates such as 4-dicyclohexylmethane-isocyanate; phenylisocyanate; alkylphenyl isocyanates such as the isomeric tolylisocyanates; diphenylalkyl isocyanates such as diphenylmethaneisocyanate; chlorophenyl isocyanates such as chlorinated phenylisocyanates; the isocyanates which can be obtained from dimerized fatty acid chlorides, for example, by Curtius re-arrangement; alkane diisocyanates such as butanediisocyanate, hexanediisocyanate, octanediisocyanate, dodecanediisocyanate; cycloalkane diisocyanates such as cyclohexane-1,4-diisocyanate; dicycloalkylalkane diisocyanates such as dicyclohexylmethane-4,4'-diisocyanate; alkylphenyl diisocyanates such as the isomeric toluylenediisocyanates; naphthalene diisocyanates such as naphthalene-1,5 - diisocyanate; diphenylalkane diisocyanates such as 4,4'-diethoxy-diphenylmethane-3,3'-diisocyanate, as well as the addition products of diisocyanates on low-molecular-weight alcohols as, for instance, the adduct of 3 mols of toluylenediisocyanate with 1 mol of trimethylolpropane. Preferably organic diisocyanates are employed for the reaction according to the invention.

The reaction between the crystalline triglycidyl isocyanurate having an epoxide oxygen content of at least 14% and the isocyanates requires a duration of from about ½ to 6 hours, preferably from 1 to 5 hours, depending on the reactivity of the isocyanate used in order to reach the end-point of a constant epoxide oxygen content in the reaction mixture. The reaction temperature ranges as a rule above the melting point of the reactants and preferably between 110° C. and 150° C.

Generally, the reaction with the object to modify crystalline triglycidyl isocyanurate, according to the invention, is accomplished in such a manner that the isocyanate is introduced in small fractions into the melted triglycidyl isocyanurate. It is also possible to conduct the reaction in the presence of organic solvents, introducing the isocyanate, advantageously while stirring and heating, into the mixture of triglycidyl isocyanurate and solvents. This method can be of advantage in the case that it is intended to further process the modified triglycidyl isocyanurate from a solution.

The termination of the reaction can be realized by the fact that the epoxide oxygen content of the reaction mixture remains constant.

The modified glycidyl isocyanurate, obtained according to the invention, is in a soft form at room temperature and remains stable in this condition for a prolonged time. Should any phenomenon of crystallization occur, this could be eliminated by heating the product for a short time. The modified glycidyl isocyanurate, according to the invention, is already at a temperature of about 50° C. to 60° C., in such a condition that it can be processed without any difficulty with the usual substances, known for the polyadduct formation with epoxide compounds to give low-viscosity, satisfactory moldable systems.

The modified glycidyl isocyanurate of the invention has an epoxide equivalent of about 106 to 150, corresponding with an epoxide oxygen content of about 15.0 to 10.3%, depending on the type and amount of isocyanate employed. The modified glycidyl isocyanurate, according to the invention, is soluble in organic solvents such as acetone, butanone, cyclohexanone, methylcyclohexanone, dioxane, tetrahydrofuran, benzyl alcohol, toluene, xylene, ethyl acetate, butyl acetate, amyl acetate, dimethylsulfoxide, chloroform and methylene chloride. Generally, solutions can be prepared with a content of about 25 to 60% of the modified glycidyl isocyanurate at room temperature.

For the further processing of the soft, hardenable, modified glycidyl isocyanurate epoxide resins of the invention to hardened molded bodies (the term "molded bodies" to be accepted in the broadest sense), the usual polyadduct formers or catalysts known for the hardening of epoxide compounds are employed.

The hardening of the reaction mixture is effected in the usual manner at temperatures of from 60° C. to 200° C., particularly from 80° C. to 180° C. over a period of from about 1 to 20 hours, preferably from 2 to 8 hours. In most cases the reaction is complete after this period of time. However, to obtain optimal values of the hardened resin, it is advisable to temper the molded bodies for an additional time at elevated temperatures of from 120° C. to 210° C.

As polyadduct formers or epoxide resin hardeners, for example, organic polycarboxylic acid anhydrides can be utlizide. In particular, the following anhydrides of hydrocarbon di- and polycarboxylic acids are considered for this purpose: hexahydrophthalic acid anhydride, tetrahydrophthalic acid anhydride, phthalic acid anhydride, methylcyclohexanedicarboxylic acid anhydride, dodecenylsuccinic acid anhydride, pyromelitic acid anhydride, endomethylenetetrahydrophthalic acid anhydride, methylendomethylenetetrahydrophthalic acid anhydride, dichloromaleic acid anhydride, hexachloroendomethylenetetrahydrophthalic acid anhydride, etc.

The amount of the organic polycarboxylic acid anhydride epoxide resin hardener to be used should be allotted so that from 0.6 to 1.2, preferably 0.8 to 0.9, carboxylic acid anhydride groups are present for each epoxide group in the molecule of the modified glycidyl isocyanurate.

Organic nitrogen compounds are also considered as polyadduct formers which contain at least two active hydrogen atoms bonded to nitrogen in the molecule. Furthermore, those organic compounds may be employed, which will form only under the reaction conditions, compounds which meet the conditions previously indicated.

A compilation of the compounds suitable as polyadduct formers or epoxide resin hardeners for the process of the invention is given in the book of A. M. Paquin, "Epoxidverbindungen und Epoxidharze," published in 1960 by Springer Verlag in the chapter concerning "Härtung in der Praxis." Of course, this reference should not imply that only those hardeners mentioned in the book are usable.

For the hardening reaction primary or secondary amines are taken into consideration, which may be of aliphatic as well as of cyclic structure. The cyclic amines may contain cycloaliphatic, aromatic or heterocyclic rings. Furthermore, such amines can be employed which contain several of the aforementioned rings. The amino nitrogen in heterocyclic amines can also represent a constituent of the ring. In the compounds previously indicated, at least two active hydrogen atoms can be bonded to one or to several nitrogen atoms. Examples of the primary and secondary amines are alkylamines such as ethylamine, propylamine, butylamine, hexylamine, dodecylamine; phenylalkylamines such as benzylamine; alkanediamines such as ethylenediamine, propylenediamine, butylenediamine, dimethylaminopropylamine, diethylaminopropylamine; alkanepolyamines such as diethylenetriamine, triethylenetetramine; cycloalkanediamines such as 1,2- or 1,4-diaminocyclohexane, 1,2 - diamino-4-ethylcyclohexane, 1-cyclohexyl-3,4-diaminocyclohexane; aniline; o,m,p-phenylenediamine; benzidine; 4,4'-diaminodiphenylmethane; also usable are condensates of aniline with formaldehyde.

Moreover, those amines can be used for the epoxide resin hardening reaction of the invention which contain additional functional groups as, for example, alkanolamines such as ethanolamine, propanolamine, N-(hydroxyethyl) - 1,2-diaminopropane, N - (hydroxypropyl)-m-phenylenediamine; 4,4' - diaminodiphenylsulfide; 4,4'-diaminodiphenylsulfone; dicyanoethyl - ethylenediamine; 1,4-bis-($\gamma$ - aminopropoxymethyl) - cyclohexane; chlorinated benzidine; 4,4'-diamino-3,3'-dichlorodiphenylmethane; 4,4-diamino-3,3' - dimethoxy - diphenylmethane, 4,4'-diaminodiphenyloxide, etc.

Favorable results in the hardening reaction have also been obtained with acid amides containing free amino groups which are prepared by reacting polyamines, such as ethylenediamine, diethylenetriamine and triethylenetetramine, with polymerized fatty acids.

The amount of the epoxide resin amine hardener to be used should be alloted so that 0.6 to 1.2, preferably 0.8 to 1.0, reactive amino hydrogens are present for each epoxide group in the molecule of the modified glycidyl isocyanurate.

As catalysts for the hardening of the modified glycidyl isocyanurates of the invention, fundamentally all of the Lewis-acids are suitable, either alone or in the form of their complexes. Above all, as Lewis-acid, borontrifluoride is considered as well as its complexes with monoethanolamine, piperidine, trimethylamine, hexamethylenetetramine, urea, pyridine, or also water, ethyleneglycol, glycerine, benzyl alcohol, triethylamine, dimethylbenzylamine, dilaurylamine, vinylpyrrolidone, caprolactam and others. Furthermore, as Lewis-acids, tin tetrachloride, titanium tetrachloride, antimony pentchloride and others are considered.

Another significant group of suitable catalysts for hardening of the modified glycidyl isocyanurates of the invention are phosphines and tertiary amines as, for example, triphenylphosphine, tetraphenylphosphonium chloride, diisopropylamine, N,N' - dimethylaniline, 2,4,6-tris - (dimethylaminomethyl) - phenol, triethanolamine borate, tetramethyl ammonium chloride, benzyltrimethylammonium hydroxide and chloride, N-alkylpyridinium salts, etc.

Also catalytically effective are alcoholates, such as aluminum triisopropylate, aluminum tributylate, aluminum, cobalt, copper or nickel compounds of ethyl acetoacetate or of acetylacetone. Also suitable is the butyl titanate.

For the further processing and hardening of the modified glycidyl isocyanurates, dyes or fillers may be added, as it is a well known practice, to the modified glycidyl isocyanurate and hardeners as, for example, quartz powder, glass powder, asbestos fibers, mica, aluminum oxide, titanium oxide, zirconium oxide, ground dolomite and barium sulfate.

When the modified glycidyl isocyanurate, according to the process of the invention, is to be processed into cast resins, preferably organic dicarboxylic acid anhydrides are used as the epoxide resin hardening agents. In contrast to the unmodified powdery triglycidyl isocyanurate, the thus obtained casting resins can be processed at a temperature of 60° C., at which temperature they retain a low viscosity for a prolonged time. It is of particular advantage that the molded bodies thus prepared display improved mechanical characteristics at constant electrical values and with a hardly noticeable drop in their Martens temperatures.

Furthermore, the modified glycidyl isocyanurates, according to the invention, can be utilized together with suitable polyadduct formers or epoxide resin hardeners for the production of adhesive bonds, for cementing purposes or as coating materials, if so desired, together with organic solvents.

The following examples will serve for better comprehension of the invention. However, it is to be understood that they do not limit the scope of the invention in any manner.

EXAMPLES 1–7

At a temperature of about 120° C., 297 gm. (1 mol) of crystalline triglycidyl isocyanurate (mixture of the high and low melting forms; epoxide oxygen content=15.5%) were melted in a 500 cc. three-necked flask equipped with a stirrer and a thermometer. Over a period of one hour, the isocyanate, of the type and in the amount as indicated in Table I, was added thereto. After this addition had been completed, the mixture was stirred for 2 hours maintaining the temperature at 120° C. At the end of this time, a constant epoxide value was obtained.

In Table I, the first column indicates the number of the example in chronological sequence; the following columns indicate the isocyanate added by type and weight, the mols of isocyanate per each mol of triglycidyl isocyanaurate, and the epoxide equivalent of the reaction product.

TABLE I

| Example | Isocyanate | Grams | Mol | Epoxide equivalent |
|---|---|---|---|---|
| 1 | Toluylenediisocyanate-2,4- | 8.7 | 0.05 | 106 |
| 2 | Toluylenediisocyanate-2,4- | 17.4 | 0.1 | 111 |
| 3 | Toluylenediisocyanate-2,4- | 34.8 | 0.2 | 120 |
| 4 | 4,4'-diphenylmethanediisocyanate. | 6.25 | 0.025 | 106 |
| 5 | 4,4'-diphenylmethanediisocyanate. | 18.75 | 0.075 | 112 |
| 6 | Diisocyanate of diameter fatty acid ($C_{36}$). | 22.6 | | 113 |
| 7 | Diisocyanate of diameter fatty acid ($C_{36}$). | 45.2 | | 123 |

HARDENING OF THE MODIFIED TRIGLYCIDYL ISOCYANURATE

Mixtures were prepared from each of 200 gm. of the modified triglycidyl isocyanurates, prepared as described in the examples, with hexahydrophthalic acid anhydride, and molded bodies measuring 10 x 15 x 120 mm. were cast at a temperature of 90° C. After the molded bodies had gelatinized, they were hardened for 3 hours at 160° C. and thereafter tempered for 20 hours at 200° C.

In the following Table II, the first column gives the number of the examples according to which the modified triglycidyl isocyanurate had been prepared; in the second column the amount of the hexahydrophthalic acid anhydride (HHPA) is indicated. The hexahydrophthalic acid anhydride is added in an amount so that about 0.85 acid anhydride groups are present for each epoxide oxygen group. The following columns indicate the resistance to deformation by heat (Martens temperature) (DIN 53,458), the impact strength (DIN 53,453), the deflection and the flexural strength (DIN 53,452). The surface leakage of current amounted in all of the cases to KA3c (DIN 53,480).

TABLE II

| Example | HHPA, gm. | Martens temp., ° C. | Impact strength, kp. cm./cm.$^2$ | Deflection, mm. | Flexural strength, kp./cm.$^2$ |
|---|---|---|---|---|---|
| 1 | 246 | 222 | 19 | 7 | 1,070 |
| 2 | 236 | 219 | 16 | 5 | 850 |
| 3 | 218 | 224 | 15 | 7 | 1,070 |
| 4 | 246 | 216 | 20 | 8 | 1,120 |
| 5 | 232 | 215 | 22 | 6 | 1,110 |
| 6 | 232 | 179 | 25 | 6 | 1,000 |
| 7 | 212 | 173 | 24 | 5 | 810 |

The preceding specific embodiments are illustrative of the practice of the invention. It is to be understood, however, that other expedients known to those skilled in the art can be employed without departing from the spirit of the invention or the scope of the appended claims.

We claim:

1. A soft epoxide resin based on triglycidyl isocyanurate produced by the process which consists essentially of the steps of reacting about 10 mols of a crystalline triglycidyl isocyanurate having an epoxide oxygen content of at least 14% with from 0.1 to 3.0 mols of an organic compound having a molecular weight of about 99 to 700, said organic compound containing at least one isocyanate group in the molecule and free of other epoxide reacting substituents, at a temperature above the melting point of the ingredients for a time sufficient for the reaction product to attain a constant epoxide oxygen content, and recovering said soft epoxide resin which is hardenable with epoxide resin hardeners.

2. The soft epoxide resin of claim 1 obtained by the process wherein from 0.2 to 2.0 mols of said organic compound containing at least one isocyanate group in the molecule is reacted with 10 mols of said crystalline triglycidyl isocyanurate.

3. The soft epoxide resin of claim 1 obtained by the process wherein said organic compound containing at least one isocyanate group in the molecule is diisocyanate.

4. The soft epoxide resin of claim 1 obtained by the process wherein said reaction is conducted at a temperature between 110° C. and 150° C.

5. A stable epoxide resin composition which comprises the product of claim 1, in combination with an organic dicarboxylic acid anhydride epoxide resin hardener, said composition being stable at temperatures up to 60° C. and hardenable at temperatures from 60° C. to 200° C.

6. A hardened epoxide resin having improved physical properties without a substatial reduction of thermal properties produced by the process which consists essentially of subjecting the stable epoxide resin composition of claim 5 to a temperature of from 600° C. to 200° C. for a time sufficient to gelatinize said composition, and recovering said hardened epoxide resin.

7. A hardened epoxide resin having improved physical properties without a substantial reduction of thermal properties produced by the process which consists essentially of subjecting the epoxide resin of claim 1 in combination with an epoxide resin hardener to a temperature of from 60° C. to 200° C. for a time sufficient to gelatinize the composition and recovering said hardened epoxide resin.

References Cited

UNITED STATES PATENTS

| | | | |
|---|---|---|---|
| 3,446,814 | 5/1969 | Budnowski | 260—307 |
| 3,337,509 | 8/1967 | Budnowski | 260—77.5 |
| 3,334,110 | 8/1967 | Schramm | 260—307 |
| 3,313,747 | 4/1967 | Schramm | 260—2.5 |
| 3,305,494 | 2/1967 | Schramm | 260—307 X |
| 3,020,262 | 2/1962 | Speranza | 260—307 X |

DONALD E. CZAJA, Primary Examiner

C. W. IVY, Assistant Examiner

U.S. Cl. X.R.

260—2, 30.4, 30.8, 31.2, 32.8, 33.4, 33.6, 33.8, 37, 78.4, 307